Patented June 7, 1932

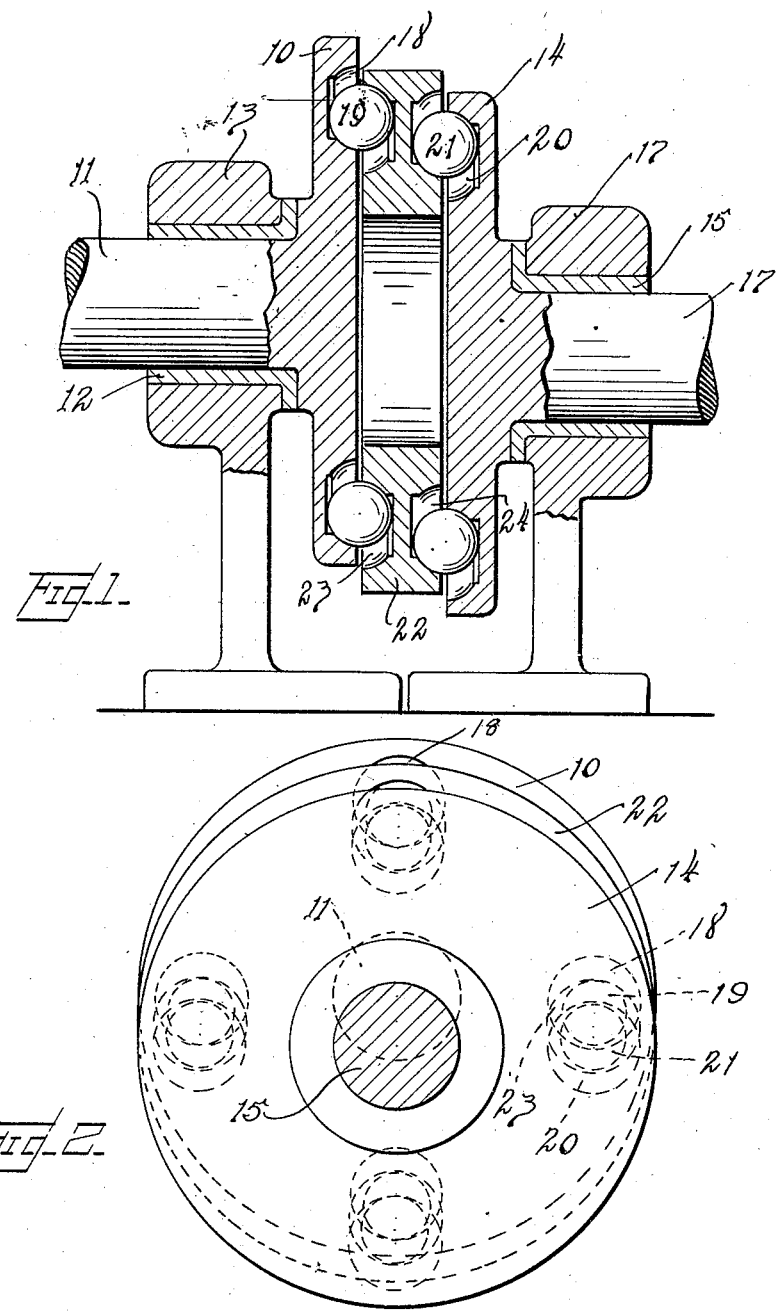

1,862,220

UNITED STATES PATENT OFFICE

JAMES P. JOHNSON, OF CLEVELAND, OHIO, ASSIGNOR TO THE J. P. JOHNSON ENGINEERING COMPANY, OF CLEVELAND, OHIO, A CORPORATION OF OHIO

COUPLING

Original application filed January 5, 1928, Serial No. 244,610. Divided and this application filed December 5, 1928. Serial No. 323,999.

This invention relates to couplings of the anti-friction type and has for its object to provide an efficient driving connection between a driven member and a drive member which rotates about eccentric axis and constitutes a division of my application Serial No. 244,610, filed January 5, 1928.

An object of the present invention is to provide, in a coupling of the type referred to, what may be termed a floating member which through cooperating members provides an efficient and quiet driving connection between the drive member and the driven member.

A further object of the invention is to provide a coupling which is simple in construction, efficient in operation and inexpensive to manufacture.

With the objects above indicated and other objects hereinafter explained in view, my invention consists in the construction and combination of elements hereinafter described and claimed.

Referring to the drawing:

Fig. 1 is a longitudinal sectional view of a coupling embodying the present invention.

Fig. 2 is an end elevational view of the same.

In the drawing, 10 represents a disk having a shaft 11, preferably formed integral therewith and of any suitable material which is mounted for rotation in a bushing 12 secured or otherwise supported in a bearing 13.

A disk 14 is provided with a shaft 15, preferably formed integral therewith and mounted for rotation in a bushing 16 supported or otherwise secured in a bearing 17. The axis of rotation of the shaft 11 and its disk 10 is eccentric with respect to the axis of rotation of the shaft 15 and the disk 14 and either the shaft 11 or the shaft 15 may be the drive member in which case the remaining shaft will be considered as the driven member. The disk 10 is provided with circular recesses 18, any number of which may be employed, although four are herein shown, these four recesses being positioned upon a common radius struck from the axis of rotation of the disk 10 and preferably spaced 90 degrees apart. The balls 19 are of any suitable diameter or size and the depth of the recesses 18 is preferably slightly less than the radius of the balls. The disk 14 is provided with recesses 20, any number of which may be employed, although four are herein shown, and are positioned upon a common radius struck from the axis of rotation of the disk 14 and preferably spaced 90 degrees apart. The balls 21 are of any suitable diameter or size, and the depth of the recesses 20 is preferably slightly less than the radius of the balls 21. While the balls 19 and 21 herein shown are of the same diameter, it should be understood that the balls 21 may be of a different diameter than the balls 19, if so desired.

The disks 10 and 14 have interposed therebetween a floater 22 and are provided with recesses 23 and 24 adjacent the recesses 18 and 20, respectively, and correspond in shape, depth and position to the recesses with which they cooperate.

With the provision of a floater 22 disposed between the disks 10 and 14, it is possible to provide relatively small recesses to receive the balls 19 and 21 and thereby obtain a greater surface engagement between the balls and their respective recesses. With the use of small balls it is possible to obtain a slower rolling action and, as a result, a much quieter operation due to the slower rolling action of the balls within the recesses. It should be understood that the invention is not limited to the use of a single floating member 22 but that any number of floating members may be employed, as desired. This construction further permits a coupling to be used in a restricted space where the over-all dimensions are limited. By this is meant that where the construction of the apparatus in which this type of coupling is employed is such that the space around the coupling is quite limited to employ this floater or floating member 22 the amount of space required for the coupling can be materially reduced.

In locating the positions of the respective grooves or recesses 18, 20, 23 and 24, a clearer understanding may be had by way of a concrete example. If the eccentricity between the shaft 11 and the shaft 15 is 1″ the axes of rotation of the balls 19 and 21 will be at points between the axis of rotation of the shaft 11 and the axis of rotation of the shaft 15. The axis of rotation of the balls 19 between the disk 10 and floater 22 would be about a point ¼" below the axis of rotation of the shaft 11, while the axis of rotation of the balls 21 would be ¼" above the axis of rotation of the shaft 15. The use of the floater 22 between the two eccentric disks 10 and 14 has considerable advantage in view of the fact, as previously stated, greater quietness can be obtained inasmuch as the balls 19 and 21 travel at a much slower surface speed than if a floater were not employed and the ball recesses being in closer relation to the size of the balls permits more of a wrapping action around the balls.

The end thrust between the disks 10 and 14 and the floater 22 is taken up by the balls 19 and 21, thereby avoiding the necessity of providing separate bearings as in the usual construction.

While I have described the preferred embodiment of the invention, it is to be understood that I am not to be limited thereto inasmuch as many changes and modifications may be made without departing from the spirit of the invention as defined in the appended claims.

Having thus described my invention, I claim:

1. In a coupling, a driving element, a driven element rotatable eccentrically with respect to said driving element, a floating member disposed between said driving element and said driven element, and means connecting said elements with said floating member comprising rolling members moving in relatively eccentric circular paths in the adjacent faces of said elements and members.

2. In a coupling, a driving element, a driven element rotatable eccentrically with respect to said driving element, a floating member disposed between said driven element and said driving element, and means connecting said elements with said floating member comprising balls moving in orbits on each of said elements and floating member respectively.

3. In a coupling, a driving element, a driven element rotatable eccentrically with respect to said driving element, a floating element disposed between said driven element and said driving element, and rolling members drivingly connecting said elements and each being rotatable about its own axis in relatively eccentric circular paths in the adjacent faces of said elements.

In testimony whereof, I hereunto affix my signature.

JAMES P. JOHNSON.